United States Patent

Bartsch et al.

[15] 3,669,922

[45] June 13, 1972

[54] PROCESS FOR THE PREPARATION OF COLORED POLYMER POWDERS OF CONTROLLED CHARGE AND PRINTING CHARACTERISTICS

[72] Inventors: Raymond C. Bartsch; Frank Lerman, both of Cincinnati, Ohio

[73] Assignee: National Distillers and Chemical Corporation, New York, N.Y.

[22] Filed: May 21, 1970

[21] Appl. No.: 39,513

[52] U.S. Cl. .................260/41 R, 96/1 SD, 106/308 Q, 117/17.5, 252/62.1, 260/2.5 R, 260/29.6 R, 260/34.2, 260/41 B, 260/41 C, 264/5, 264/9, 264/15, 264/117
[51] Int. Cl. .........................................C08f 1/86, G03g 9/02
[58] Field of Search................106/308 Q; 260/41 R, 41 B, 260/41 C, 34.2, 29.6 R, 2.5; 264/5, 9, 15, 117; 252/62.1; 96/1 SD; 117/17.5

[56] References Cited

UNITED STATES PATENTS

| | | | |
|---|---|---|---|
| 3,244,633 | 4/1966 | Yellin et al. | 252/62.1 |
| 3,326,848 | 6/1967 | Clemens | 260/41 |
| 3,417,019 | 12/1968 | Beyer | 252/62.1 |
| 3,449,291 | 6/1969 | Lerman et al. | 260/41 |
| 3,402,140 | 9/1968 | Bickel et al. | 260/33.2 R |
| 3,541,040 | 11/1970 | Eastes et al. | 260/33.2 R |
| 3,346,530 | 10/1967 | Martins | 260/33.2 R |
| 3,590,000 | 6/1971 | Palermiti et al. | 252/62.1 |

FOREIGN PATENTS OR APPLICATIONS 699,971   8/1967   Belgium

OTHER PUBLICATIONS

International Encyclopedia of Chemical Science (Van Nostrand) (N.Y.) (1964), page 772.

Primary Examiner—Morris Liebman
Assistant Examiner—H. H. Fletcher
Attorney—Allen A. Meyer, Jr.

[57] ABSTRACT

A process is provided for preparing colored polymer powders with controlled charge and printing characteristics when used as toners in electrostatic printing. The process comprises a controlled heating, melting, and dispersion of a polymer in the presence of water and surfactant. The polymer contains a coloring agent and a specially selected charge-directing agent, such as a nigrosine dye or a metal powder. Colored powders can thus be obtained composed of spherical particles which have exceptionally fine printing characteristics, when used as toners in electrostatic printing processes, and which have controlled average size and size distribution.

18 Claims, No Drawings

PROCESS FOR THE PREPARATION OF COLORED POLYMER POWDERS OF CONTROLLED CHARGE AND PRINTING CHARACTERISTICS

The availability of polymer powders in recent years has developed a number of industrial uses, and as the uses have become more highly refined, demand has arisen for colored powders consisting of uniform particles, preferably spherical in shape, with a controlled size and size distribution and certain other specific physical properties. Polymer powders are used to coat various types of articles, by dip-coating in a stationary or a fluidized bed of the powder, by powder coating (wherein the powder is applied by spraying or dusting), by flame spraying, and by electrostatic attraction. In these uses, the polymer powders are necessarily thermoplastic or in a thermoplastic stage of polymerization, since the melting of the powders is a necessary step in the adhesion of the particles to the base, and in the formation of a continuous coating film. Such polymer powders have also been applied in dispersed form as coatings by roller coating, spray coating, slush coating, dip coating, and electrostatic coating, to substrates such as metal, paper, paper-board, and the like.

These powders have also been employed in conventional powder molding techniques; as additives to waxes and paints and polishes; and as binders for nonwoven fabrics.

Electrostatic copying, duplicating, printing and gravure processes have opened new requirements for powders consisting of black, white or colored particles of narrow size distribution and controlled size, and other physical, chemical, mechanical and electrostatic properties, for use as toners or inks in the dry form or suspended in liquid, and as developers for electrostatic coating processes, such as in the Xerox and Electrofax copying processes.

In these uses, it has become increasingly important that the particles of the polymer powder have consistent and stable properties, and be available in a controlled size and size distribution. Particularly important, when used as toner, is the charge acquired by the particles, its intensity and the charge decay rate. The particles should acquire a positive charge, when used in the Electrofax dry-toner copying process, and a negative charge when used in the Xerox process, and this charge has to be of a sufficient intensity to form a dark print having sharp definition of the image. The particles must also be colored, for good contrast with the background of the base on which the print is laid down.

Such properties are particularly desirable in specialized research studies, using the particles as aerosol tracers, as simulants, and as standards for study of chemical, biological, meterological, and radioactive air dissemination, and for oceanography studies. It is therefore important to be able to prepare these materials by a process that is easy to carry out, and that is precisely duplicatable, so as to produce particles of controlled and standardized properties through a judicious selection of the polymeric material, additives, processing media, and process operating conditions.

Colored thermoplastic powders can be made by grinding coarse, colored thermoplastic cubes, pellets, etc., to the desired sizes. Such products, in varying particle sizes, can be made by incorporating pigments or dyes in a mixture or blend of resins which are subsequently passed through a high shear pulverizing device, and then size-classified on a shaker screen or in an air classifier. The particles thus produced are irregular and nonuniform in shape and the particles should be uniform in shape, since a uniform spherical shape contributes superior flow and fluidization characteristics, and improved dispersibility to the powders.

The surface of polymer particles can be coated with a coloring agent by conventional dyeing techniques. However, dyeing particles by coating them on the outside is a difficult procedure, and unless special care is exercised, the coating is nonuniformly distributed, and the material is tacky. Moreover, surface coatings can be removed by natural friction and abrasion during powder flow, or by solvents. Where color is added to the particles, uniformity of color distribution among and within the particles is important for overall uniform color effects of the powder, and/or of the products or coatings formed from it, or in particle detection, and in quantitative determinations in air dispersion and tracer studies.

In some uses, it is important for the particles to have densities different from the polymer density. Density can be decreased by incorporation of foaming agents, or increased by incorporation of fillers. The polymer properties can be modified by incorporation of other polymer additives, and here also it is important that the additives be uniformly distributed in the polymer, so that the individual particles in addition to being of a uniform size and shape, will be uniform in the desired property.

The prior processes for preparing polymer powders from coarser forms, such as cubes, pellets, chips, flakes, granules, and the like, which forms usually are available commercially, are of three main types: (1) mechanical grinding to form coarse or fine powders, and (2) solution, and (3) dispersion, to form fine powders.

Coarse polymer powders are obtained by mechanically grinding the coarser forms by passing them through a high shear pulverizing device, such as a Pallmann grinder, to yield particles of irregular shape, having diameters ranging from about 75 to about 300 microns. Such powders are not suitable for many applications, where spherical particles of the same, slightly larger or much finer size, sometimes desirably in a narrow size distribution, are necessary.

The ground powders are classified as to particle size on a shaker screen or in an air classifier. Grinding and size-classifying are expensive procedures, requiring excessive power, close control, and special and expensive equipment. Moreover, an appreciable part of the classified material is off-size, and must be reprocessed, used for other purposes, or disposed as waste. In addition, since the particles produced are irregular and nonuniform in shape, they are not entirely suitable for many applications, wherein spherical particles are preferred.

In the solution process, the polymer is dissolved in a solvent, and then precipitated from the solvent in finely divided form. The precipitation is accomplished by addition of a nonsolvent which is miscible with the solvent, and therefore rapidly reduces solubility of the polymer in the solvent; or by evaporation of the solvent to exceed the solubility of the polymer; or by a combination of the two methods. Emulsifying agents can be used, to aid in breaking down the size of the particles formed by such precipitation techniques. In these processes, there are difficulties in handling the solvent, and in completely removing the solvent from the polymer particles. Also, the resulting particles are in a wide size distribution, and must be classified, if particles of a narrow size distribution are desired. Also, the particles from these processes are of an irregular although somewhat rounded shape. This processing is costly, and not entirely satisfactory for many applications.

The dispersion process requires the suspension of the polymer in a liquid medium, with the aid of dispersing agents, after which the dispersion is subjected to high shear agitation. Water is generally the preferred liquid medium, because of low cost and simplicity of operation. The usual dispersing agents are soaps, such as sodium stearate. The polymer is then reduced to a molten condition, and the resulting molten mass is then dispersed in the liquid medium. If the dispersing agent is incorporated in the polymer before dispersion, the presence of the dispersing agent residues in the polymer may create undesirable changes in the polymer properties, for example, increased water sensitivity, reduced electrical resistivity, and other difficulties. Removal of these residues is, however, difficult, if not impossible. A further difficulty is that such dispersing agents tend to become inactive at elevated temperatures, as a result of which the operating temperature range is so low that only relatively low molecular weight polymers, such as low molecular weight polyethylene, are sufficiently fluid at such temperatures to be dispersible in water. These processes have therefore not been applicable to the preferred high melting thermoplastic polymer types. Also no control of particle characteristics are indicated.

In accordance with the present invention, a process is provided for preparing colored polymer powders of controlled charge-acquiring and printing characteristics, when used as toners in electrostatic printing processes, as well as controlled particle size and size distribution, having consistent and stable physical, chemical, mechanical, electrostatic and aerodynamic properties. By judicious selection of the charge-directing additive, polymeric material, coloring agent, and any other additives; processing media; and operating conditions; it is possible to modify, control and standardize the charge-acquiring and other properties of the colored powder, and the particles of which it is composed. Due to such control of the process, it is often quite unnecessary to subsequently classify these colored powders for the desired average particle size and size distribution.

The charge acquired by the powder particles of this invention when used as a toner in electrostatic printing is controlled by the charge-directing agent. It has been determined, for example, that certain dyes are capable of modifying the electrical properties of the colored particles, so that the powders acquire a positive or negative charge, as required by the electrostatic printing process in which they are to be used. Metal particles are capable of further modifying these properties, so that an intensified charge, either positive or negative is acquired by the colored particles. Both such dyes and metal powders are encompassed by the term "charge-directing agent", as used herein.

The charge-directing agent for use in the practice of this invention may be any suitable dye. It must be heat-stable at the dispersion temperature of the polymeric material, should not react chemically with the polymeric material, and preferably should exhibit neglibible or moderate solubility in water. Moreover, the charge-directing agent should be light stable and should not "bleed" or "migrate" from the thermoplastic resin after dispersion. Examples of possible materials include azine dyes such as the indulines, nigrosines, and wool fast blues, oxazine dyes such as Meldola Blue and Nile Blue, thiazine dyes such as methylene blue, azo dyes such as naphthal blue black, sulphon cyanine black, diazo dyes such as Diamond Black F, cyanine dyes, indigosol dyes such as Algosol Blue, anthiaquinone dyes, ketonimine dyes, Xanthine dyes, and indamine and indophenol dyes.

These dyes are not normally thought of as suitable for coloring plastics, and in this invention they are used not as coloring agents but in conjunction with the usual coloring agents, such as dyes and pigments.

Metal particles as a class can be used to intensify the charge-acquired. Pigment-type powders or submicron type powders can be used. Copper, zinc, nickel, iron, cadmium, tin, aluminum, bronze, brass and steel particles can be used.

Quite small amounts of charge-directing agent are sufficient. As little as 0.001 percent by weight of the polymer is effective, and amounts as high as 25 percent by weight have been used without deleterious effect. Optimum results are obtained at from 0.01 to 10 percent, and such amounts are therefore preferred.

The charge-directing agent and the coloring agent can be uniformly distributed throughout the particles by compounding or preblending the bulk or particulate polymer therewith, giving a uniform color and charge-acquiring effect which is stable and durable, because the color is distributed throughout the mass. The particles have a spherical or other regular shape, contributing superior powder flow and fluidization characteristics, a shorter melting time, improved dispersibility, and less variation in powder and particle characteristics, due to controlled particle shape, size and size distribution.

In the process of this invention, a polymer (in particulate form or as a molten mass), containing a coloring agent, and a charge-directing agent, is dispersed in an inert liquid by high shear agitation at a temperature above the melting temperature of the polymer, in the presence of a surfactant. Agitation is continued at such temperature for a time sufficient to shape the colored particles, and maintain or change their size and/ or size distribution. The resulting particle size may be the same as or larger or smaller than the starting particle size; and the particle size distribution can also be narrowed or broadened. The colored particles are then cooled, so as to solidify them and stabilize them in that shape and size.

The coloring agent can be any suitable pigment, dye, opacifier, brighteners, and fluorescent agent, or the like. It must be heat-stable at the dispersion temperature of the polymeric material, should not react chemically with the polymeric material, and preferably should exhibit negligible or moderate solubility in water. Moreover, the colorant should preferably be light-stable and should not "bleed" or "migrate" from the thermoplastic resin after dispersion. Examples of suitable materials include carbon black, phthalocyanine blue, fluorescent coloring agents or dyes, phthalocyanine green, cadmium sulfide, cadmium sulfide selenide, titanium dioxide, calcined iron oxide, chromic oxide, zinc oxide, and the like.

The concentration of coloring agent can be within the range from about 0.001 to about 1 part by weight per part of the polymer colorant mixture. Usually, the concentration is within the range from about 0.005 to about 0.2 part, with the preferred proportion being from about 0.002 to about 0.15 part by weight.

In the preferred embodiment of the practice of this invention, the coloring agent and charge-directing additive are incorporated into the polymeric material by combining said colorant with a finely divided or granulated polymer in a mixing device such as a twin-cone blender and then mixing the two on a twin-roll mill, in a Banbury mixer, in a conventional screw extruder, or in other suitable equipment where the heat, either applied or generated by friction, is controlled to aid the blending of the agent into the polymer and at the same time to minimize polymer degradation. The blended material is then granulated or pelletized by conventional means.

The blend is subsequently contacted with water and the selected dispersing agent in any suitable dispersing apparatus. After heating and agitation, the system is cooled rapidly and the product is recovered, for example by filtration, washing, and drying.

Because of the large number of variables that can be controlled to affect the shape, size and size distribution of the particles, the process of the invention is of extraordinary versatility. For any given type of resin, it is possible to adjust the operating parameters so as to produce particles in a regular shape and surface configuration and in any size within the range from 1 to 1,000 microns, controlled within a wide, narrow, or very narrow size distribution. This is accomplished by selection of the appropriate group of process variables, and standardizing the process operating conditions to obtain the desired size and shape of particles. The very great versatility of the process at the same time introduces an element of uncertainty in the prediction of the effect of a given set of variables on a particular polymer without trial and experiment, simply because mathematical and physico-chemical computations are inadequate to accommodate these variables in a set of mathematical formulae or equations. The physical phenomena are extremely complex, involving shear forces, surface tension forces, densities, viscosities van der Waal's forces, and cohesion and adhesion of soft particles, under conditions virtually impossible to measure or even evaluate. It is therefore necessary to establish the proper operating parameters for any given type of particle and type of polymer by trial and error experimentation. Such tests afford little difficulty, however, to one skilled in this art, and are easily carried out, by taking into consideration the variables that affect particle size and size distribution.

The thermoplastic material suitable for preparing polymer powders of this invention must have negligible or only slight solubility in water or other liquid medium used, and it must be capable of forming intimate, uniform mixtures with the coloring agent and charge-directing agent. It is also important that the polymeric material be immiscible in the liquid suspending medium at the operating temperature. Although this invention will be described with reference to polyethylene, it is to be understood that the scope of the invention includes other olefin homopolymers and copolymers, such as polypropylene, polyisobutylene, and polyisopentylene; polyfluoroolefins, such as polytetrafluoroethylene and polytrifluorochloroethylene; polyamides, such as polyhexamethylene adipamide, polyhexamethylene sebacamide, and polycaprolactam; acrylic resins, such as polymethylmethacrylate, polyacrylonitrile, polymethylacrylate, polyethylmethacrylate, and styrene-methylmethacrylate; ethylene-methyl acrylate copolymers, ethylene-ethyl acrylate copolymers, ethylene-ethyl methacrylate copolymers, polystyrene, cellulose derivatives, such as cellulose acetate, cellulose acetate butyrate, cellulose propionate, cellulose acetate propionate, and ethyl cellulose; polyesters, such as polycarbonates; polyvinyl resins, such as polyvinyl chloride, copolymers of vinyl chloride and vinyl acetate, and polyvinyl butyral, polyvinyl alcohol, polyvinyl acetal, ethylene-vinyl acetate copolymers, ethylene-vinyl alcohol copolymers, and ethylene-allyl copolymers, such as ethylene-allyl alcohol copolymers, ethylene-allyl acetate copolymers, ethylene-allyl acetone copolymers, ethylene-allyl benzene copolymers, ethylene-allyl ether copolymers, and ethylene-acrylic copolymers; and polyoxymethylene.

Exemplary thermosetting materials in a thermoplastic stage of polymerization are phenol-formaldehyde, urea-formaldehyde, melamine-formaldehyde and alkyd resins, and polyesters.

The surfactants are nonionic, and the preferred surfactants have a water-insoluble nucleus of a polyoxyalkylene glycol other than ethylene glycol, with a molecular weight of more than 900, which has been extended with water-soluble polyoxyethylene groups at each end. The water-soluble portion of the molecule should constitute at least 50 percent by weight of the total. The polyoxyalkylene glycol can be aliphatic, aromatic or alicyclic in nature, can be saturated or unsaturated, and can be represented by the formula:

$$HO(C_2H_4O)_y(C_mH_nO)_x(C_2H_4O)_yH$$

wherein $x$, $y$, $m$ and $n$ are integers. When $(C_mH_nO)_x$ is saturated aliphatic, $n = 2m$.

Compounds in this class are described in U.S. Pat. No. 2,674,619 to Lundsted, dated Apr. 6, 1954 and No. 2,677,700 to Jackson et al., dated May 4, 1954.

The polyoxyalkylene compounds of U.S. Pat. No. 2,674,619 are defined by the formula:

$$Y[(C_3H_6O)_n - E - H]_x$$

where

Y is the residue of an organic compound containing therein $x$ active hydrogen atoms, $n$ is an integer, $x$ is an integer greater than 1.

The values of $n$ and $x$ are such that the molecular weight of the compound, exclusive of E, is at least 900, as determined by hydroxyl number, E is a polyoxyalkylene chain wherein the oxygen/carbon atom ratio is at least 0.5, and E constitutes at least 50 percent by weight of the compound.

The polyoxyalkylene compounds of U.S. Pat. No. 2,677,700 are defined by the formula:

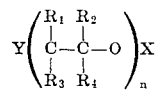

wherein:

Y is the residue of an organic compound containing therein a single hydrogen atom capable of reacting with a 1,2-alkylene oxide, $R_1$, $R_2$, $R_3$ and $R_4$ are selected from the group consisting of H, aliphatic radicals and aromatic radicals, at least one such substituent being a radical other than hydrogen, $n$ is greater than 6.4 as determined by hydroxyl number and X is a water-solubilizing group which is nonionic and constitutes at least 50 percent by weight of the total compound.

The compounds of U.S. Pat. No. 2,674,619 are available commercially under the trademark "Pluronic." The following are examples of compounds corresponding to the above formula:

| Name | Molecular weight polyoxypropylene base | Ethylene oxide content in final product, weight percent | Molecular weight of final product |
|---|---|---|---|
| Pluronic F 68 | 1,700 | 80 | 8,750 |
| Pluronic P 75 | 2,050 | 50 | 4,100 |
| Pluronic F 98 | 2,700 | 80 | 13,500 |
| Pluronic F 108 | approx. 3,400 | 80 | 12,000 – 22,000 |

Another group of emulsifiers that can be employed has a water-soluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight per cent of the hydrophilic portion of the molecule should be at least 50. This type of emulsifier is available commercially under the trademark "Tetronic." These are ethylene oxide adducts of an aliphatic diamine such as ethylene diamine extended with propylene oxide having the following formula:

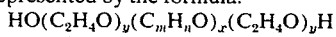

where $x$ and $y$ are as defined above.

Compounds in this class are described in U.S. Pat. Nos. 2,674,619 and 3,250,719 and are available commercially under the trademark "Tetronic." The following are examples of compounds corresponding to the above formula:

| Name | Molecular weight for ethylene diamine-propylene oxide base | Ethylene oxide content in final product, weight percent | Molecular weight of final product |
|---|---|---|---|
| Tetronic 707 | 3,000 | 75 | 12,000 |
| Tetronic 908 | 4,050 | 85 | 27,000 |

Other compounds in this class include ethylene oxide adducts of polyhydroxy alcohols extended with alkylene oxide, ethylene oxide adducts of polyoxyalkylene esters of polybasic acids, ethylene oxide adducts of polyoxyalkylene-extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50 percent by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Such compounds can be of the following formulae ($m$, $n$, $x$ and $y$ are as above):

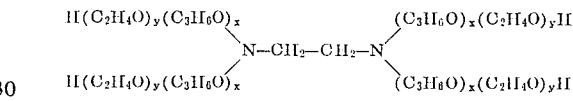

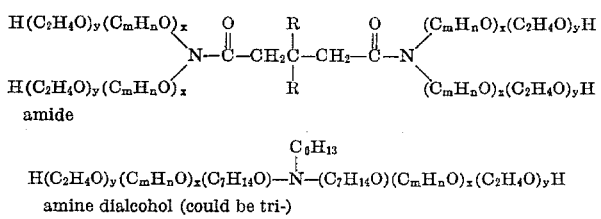

amide

H(C₂H₄O)ᵧ(CₘHₙO)ₓ(C₇H₁₄O)—N(C₆H₁₃)—(C₇H₁₄O)(CₘHₙO)ₓ(C₂H₄O)ᵧH amine dialcohol (could be tri-)

A third group of nonionic emulsifiers that can be employed includes high molecular weight polyoxyethylene adducts of hydrophobic organic compounds having one active hydrogen, such as aliphatic, saturated or unsaturated alcohols having at least 18 carbon atoms; mono- or di-substituted alkyl, alkenyl or alkynyl aromatic or alicyclic alcohols of at least 15 carbon atoms; monobasic aliphatic, saturated or unsaturated aromatic or alicyclic monobasic hydroxy acid derivatives such as N-alkyl, -alkenyl or -alkynyl amides or alkyl, alkenyl or alkynyl esters of at least 18 carbon atoms; alkyl, alkenyl or alkynyl glycol monobasic acid esters of at least 18 carbon atoms; or di-N-alkyl, -alkenyl or -alkynyl (aromatic or alicyclic) aminoalkanols having at least 18 carbon atoms. The hydrophilic portion of these molecules should be at least 50 percent by weight of the total. Such compounds can have the following formulae ($m$, $n$, $x$ and $y$ are as above):

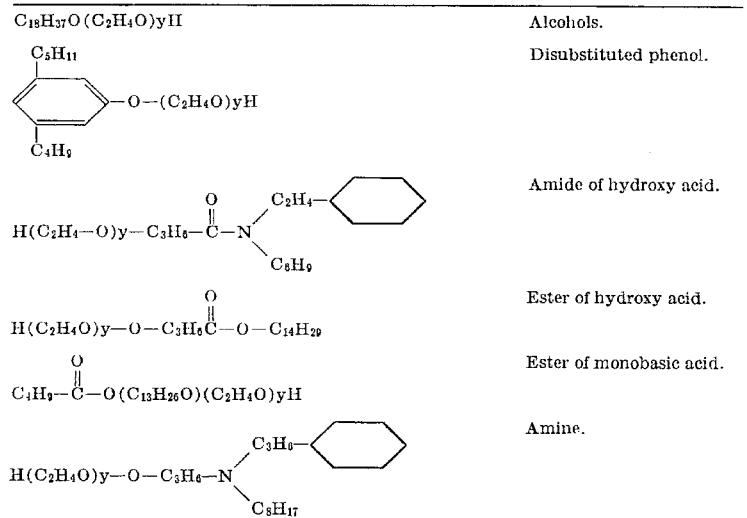

Additional suitable surfactants are water-soluble block copolymers of ethylene oxide and propylene oxide. They are preferably water-soluble block copolymers of ethylene oxide and propylene oxide having a molecular weight above about 3,500 and containing a major proportion by weight of ethylene oxide. Such compounds are both stable and effective as dispersing agents for thermoplastic polymers at temperatures ranging up to about 500° F. or higher, and more particularly at temperatures above about 280° F., especially temperatures in the range of about 280° to 400° F. Representative of such compounds are those prepared by polymerizing ethylene oxide on the ends of a preformed polymeric base of polyoxypropylene. Both the length and the molecular weight of the polyoxypropylene base and the polyoxyethylene and segments can be varied to yield a wide range of products. One example of a suitable surfactant is a polyoxypropylene of average molecular weight of 2,700 polymerized weight ethylene oxide to give a product of molecular weight averaging about 13,500; it contains about 20 weight percent of propylene oxide and about 80 weight percent of ethylene oxide. Other effective agents include (a) 50 weight percent each of propylene oxide and ethylene oxide, molecular weight 6,500; (b) 20 weight percent of propylene oxide and 80 weight percent of ethylene oxide, molecular weight 11,250; (c) 20 weight percent of propylene oxide and 80 weight percent of ethylene oxide, molecular weight 16,250; and (d) 50 weight percent each of propylene oxide and ethylene oxide, molecular weight 4,500.

In the preferred embodiment, the coloring agent and charge-directing agent are incorporated into the polymeric material by combining them with a finely divided or granulated polymer in a mixing device such as a twin-cone blender and then mixing the two on a twin-roll mill, in a Banbury mixer, in a conventional screw extruder, or in other suitable equipment where the heat, either applied or generated by friction, is controlled to aid the blending of the agents into the polymer and at the same time to minimize polymer degradation. The blended material is then granulated or pelletized by conventional means.

The blend is subsequently contacted with water and the selected dispersing agent in any suitable dispersing apparatus. After heating and agitation, the system is cooled rapidly and the product is recovered, for example, by filtration, washing, and drying.

The dispersing apparatus may be any device capable of delivering at least a moderate amount of shearing action to a liquid mixture under elevated temperatures and pressures. An example of suitable apparatus is a conventional autoclave equipped with conventional propeller stirrers. Propellers designed to impart greater shear to the mixture can affect the average particle size and size distribution of recovered polymer. The average particle size and size distribution of the powder product are influenced by the type of equipment, agitation time, stirring rate, and other operating and design factors. Higher stirring speeds generally result in finer and narrower dispersions until an optimum speed is reached. The stirring period at dispersion temperatures is generally from about 1 to 24 minutes at agitator tip speeds of from 400 to 4,000 linear feet per minute, but preferably about 5 to 15 minutes at tip speeds of about 600 to 1,000 linear feet per minute. The stirring rates and periods, however, depend upon the material processed and the type of equipment used.

The surfactant need not be incorporated by milling or the like into the polymer in advance but may be introduced into the dispersing apparatus as a solid or as an aqueous solution simultaneously with the other ingredients. If desired, the dispersing process may be operated in a continuous manner.

The operating conditions, such as polymer concentration, ratio of surfactant to polymer, agitation tip-speed, agitation time, and operating temperature depend upon the type of polymer used, the type and concentration of the coloring agent and charge-directing agent. The surfactant type, the liquid medium selected, and the particle size distribution desired in the product.

The temperature of operation is dependent upon the melting point, melt flow properties, decomposition temperature, and desired fineness of dispersion of the selected synthetic organic thermoplastic resin. While such resins can be dispersed at temperatures as low as their respective melting points increases in dispersion temperature beyond the melting point and up to the decomposition of the resins are generally accompanied by corresponding increases in the fluidity of the molten resin. As the fluidity of the melt increases, the dispersions are generally expected to develop lower average particle sizes without requiring increases in agitation effort, although frequently very fine particles have been produced at the lower temperatures.

In the specific embodiment of this invention for preparing polymer powders of very fine particle size, for example, homopolymers and copolymers of average particles size less than 10 microns, the dispersion temperature is at least 25° F., above the melting point of the polymer blend, and preferably is at least 60° F. above the melting point.

For the preferred polymers, dispersion temperatures range from about 230° to 500° F. As aforementioned, the use of lower temperatures, that is down to the melting point of the polymer, will also yield dispersions, but often of a coarser particle size.

The pressure in the dispersion vessel is adjusted to exceed the vapor pressure of the liquid medium at the operating temperature (above the melting point of the polymer blend) so as to maintain a liquid phase. More particularly, the pressures may range from about 1 to 217 atmospheres, and preferably from about 6 to 120 atmospheres. In cases where the polymer is sensitive to air at the elevated dispersion temperatures, an inert gas, e.g., nitrogen or helium, may be substituted for the air normally present.

Drying of the recovered finely divided polymer generally yields a free-flowing powder of fine particle size and relatively narrow particle size distribution. In general, the particles of a powder so produced are all less than about 1,000 microns in diameter. By varying the composition of the selected dispersing agents, the ratio of polymer to water, and other material concentrations and operating conditions, powders can be made having average particle sizes ranging from about 300 microns to as low as 3 microns. Especially preferred are powders of narrow particle size distribution and average particle size less than 20 microns, and often desirably less than 10 microns.

For water/ polyethylene dispersions, about 1 to about 20 parts by weight of water are used per part of the resin/ coloring agent, the preferred range being about 2.5 to about 10 parts. The ratio of the surfactant to the polymer/ coloring agent blend in the reactor may range from about 0.1 to about 2 parts by weight of surfactant per part of polymer/ coloring agent with a preferred range of about 0.2 to about 1 part.

The agitator speed in the dispersion vessel used in the following examples is in the range of about 400 to 4,000 linear feet per minute, and the agitation time is in the range of about 1 to 24 minutes at the dispersion temperature.

By the practice of this invention there are obtained colored thermoplastic powders composed of discrete, spherical particles in which the coloring agent and charge-directing agent are uniformly dispersed. The particles have diameters in the range of 1 to about 1,000 microns with an average particle diameter from about 3 to about 300 microns size. These particles are especially useful as a colored or black toner or for a photoconductive coating in electrostatic printing processes. They also will provide standard spherical particles for research; in air dissemination studies; for use as simulants for chemical, biological, radioactive, aerosol dispersion, and oceanography tracer work; and for application as a signal powder. They also can be used to provide colored, black, and opaque white coatings for paper and textiles, and in dip-coating of heated metal parts. They can also be used to form colored, pressed pellets where they act as porous or solid binders for other material, and they are satisfactory replacements for white finely divided thermoplastics wherever a colored product is desired.

The nature and the amount of additive in the thermoplastic composition affect the physical properties of the final product. Since many types of thermoplastics can be used and since other additives can be incorporated in the polymer composition with the coloring agent and charge-directing agent, it is possible to produce powders with special physical properties as to particle size, density, color, surface characteristics, aerodynamic and electrostatic properties, and so forth.

When materials, concentrations, and operating conditions normally conducive to producing unpigmented spherical polyethylene particles were applied to pigmented polyethylene, only large globules or fine to coarse fibers were produced. By modifying conditions, however, particularly by lowering the temperature and by using polyethylenes of higher melt index, powders consisting of fine spherical particles were consistently produced.

When mechanically ground or irregularly shaped particles of thermoplastic homopolymers or copolymers in the size range of about 0.25 inch down to about 10 microns, some containing pigments, some unpigmented, and others containing blowing agents and other additives, were processed in the same manner except that agitation was started simultaneously with heating and continued throughout the heating cycle, various-sized spherical particles were produced. The size depended primarily upon the type of polymer blend, the amount of surfactant, and the original size of the particle. Some, particularly the large irregular particles, were reduced to very fine spherical particles. The intermediate and small-sized irregular particles, i.e., below about 500 microns, tended to retain their original size when spherized unless excessive surfactant was used, in which case reduction in particle size tended to occur. In other cases, particularly with blowing agent additives, finer particles tended to fuse into larger spherical particles to produce narrow size-distribution ranges. These results and the hypotheses developed to explain them can serve as a basis for controlling average size and size distribution of the particles of this product.

The mass or blend of solid polymer particles or molten polymer, a suitable surfactant, together with coloring agent, and charge-directing agent (if not previously blended with the polymer), and the dispersing liquid, usually water, are placed in the reactor. The mixture is then gradually brought to the desired operating temperature, above the initial melting temperature of the polymer, with or without agitation while so doing, and then stirred at the desired speed and for the desired time, to reduce the polymer to the desired form, size and size distribution of the polymer particles. The dispersion is then cooled, so as to solidify the colored polymer particles, and stabilize their shape, size and size distribution, while continuing the agitation, after which the particles can be separated by filtration, or centrifuging, or by otherwise removing the liquid. Rapid cooling can be obtained by venting the reactor to reduce the pressure, thereby volatilizing some of the liquid. The powder can then be washed and dried.

The following examples in the opinion of the inventors represent preferred embodiments of their invention:

EXAMPLE I

A high melt index, low density granulated polyethylene was compounded with 5 percent by weight of Vulcan 3 carbon black and 1 percent (Allied Chemical's) Nigrosine Base N on a two-roll Thropp Mill for 20 minutes at 255° F. Two hundred and one grams of this blend was charged with 201 grams of Pluronics Surfactant F-98 and 938 grams water in a baffled, 2-liter, stainless-steel Parr-bomb reactor, equipped with three, air driven, 3 inch-diameter, six blade turbine rotors. The bottom of the reactor was fitted with a ½-inch ball valve and discharge line, for quick venting and cooling of the liquid polymer particle dispersion. The reactor assembly was inserted in a small electric furnace for heating. The change was heated to 275° F. without stirring. Then, while stirring at 1,060 linear feet per minute tip speed (LFPM), it was held at 275° F. for 4 minutes. The charge was then rapidly discharged and cooled. A fine black powder was formed. Some of the dye was found dissolved in the water phase. The powder was filtered, washed and vacuum dried for 6 hours.

A wet-screened fraction of this powder passing through a 37 mesh screen was dried and tested for printability as a copying toner with a suitable carrier.

Using a Xerox copying process, a very poor print was obtained. This was unlike the powder, prepared as above, except that no dye was used, that gave a good print. However, when using the dye-modified powder in Electrofax dry-toner copying, good prints were obtained, unlike when no dye was used. The results indicate that the Electrofax carrier induced a positive charge on the dye-modified powder surface. The small amount of dye additive thus modified appreciably the potential toner usage for the pigmented powder. Similar results were obtained with some minor variations in print quality when Allied Chemical's Nigrosine Spirit, concentrated powder, and concentrated crystals were used in turn as the additive.

EXAMPLE II

When Example I was repeated, adding minute quantities of submicron copper to the carbon-pigmented polyethylene, highly electrically charged or chargeable particles are formed. These showed strong interparticle electrical attraction and repulsion not evidenced in the similarly prepared carbon-pigmented polyethylene without the submicron copper addition.

EXAMPLE III

The procedure of Example I was repeated except that the charge-directing agent was Nile Blue A. Results similar to those in Example I were obtained, when the finished product was used as a toner in electrostatic copying machines.

EXAMPLE IV

The procedure in Example I was repeated except that the charge-directing agent was Algosol Blue. In this instance the finished product when used as a toner gave acceptable prints in the Xerox process and poor prints in the Electrofax process. The results indicate that Xerox carrier induced the required negative charge on the dye modified powder.

EXAMPLE V

The procedure in Example I was repeated except that the charge-directing agent was Diamine Black BH. Results similar to those in Example IV were obtained.

EXAMPLE VI

Into the same equipment given in Example I were charged 168 grams of Pluronic F-98, 914.5 grams of water and 168 grams of an ethylene/ vinyl acetate copolymer having a density of 0.938 g/cc and a melt index of 7 and containing 5 percent by weight of Vulcan 3 carbon black and 1 percent Nigrosine Base N. The charge was heated to 325° F. and agitation at 780 LFPM applied for 6 minutes. Product recovery was the same as in Example I. Results similar to those in Example I were obtained, when the product was used as a toner in electrostatic copying machines.

Having regard to the foregoing disclosure, the following is claimed as the inventive and patentable embodiments thereof:

1. A process for preparing colored polymer powders of controlled charge-accepting properties and particle size and/or shape and/or size distribution, especially useful as toner powders in electrostatic printing processes, comprising
   A. blending
   1. a synthetic thermoplastic polymer,
   2. 0.001 to 1 parts by weight, per part of polymer, of a coloring agent selected from the group consisting of carbon black, phthalocyanine blue, phthalocyanine green, cadmium sulfide, cadmium sulfide selenide, titanium dioxide, calcined iron oxide, chromic oxide and zinc oxide, and
   3. 0.00001 to 0.25 parts by weight, per part of polymer, of a charge-directing agent, which is a dye selected from the group consisting of azines, nigrosines, oxazines, thiazines, azos, diazos, cyanines, indigosols, anthraquinones, ketonimines, xanthines, indamines and indophenols;
   B. dispersing the blend in an inert dispersing liquid in the presence of 0.1 to 2 parts by weight, per part of blend, of a nonionic surfactant;
   C. subjecting the dispersion to agitation at a temperature above the melting temperature of the polymer, but below the decomposition temperatures of the various constituents, while forming the polymer in particle form with the coloring agent and charge-directing agent uniformly distributed in or on the particles;
   D. continuing the agitation for a time sufficient to shape the particles, and control their size at less than about 1,000 microns; and then
   E. cooling the colored particles so as to solidify them and stabilize them in that shape and size, and size distribution.

2. A process according to claim 1 in which the polymer is particulate, and the polymer blend thus obtained is dispersed in the liquid while in particulate form.

3. A process according to claim 2 in which the polymer is molten, and the polymer blend thus obtained is dispersed in the liquid while molten.

4. A process according to claim 1 in which the particles are brought to a regular shape and surface configuration and average size within the range from about 1 to about 1,000 microns, with an average particle diameter from about 3 to about 300 microns.

5. A process according to claim 1 in which particle size is controlled by heating the dispersion at a temperature within the range from about 230° to about 500° F.

6. A process according to claim 1 in which particle size is controlled by control of the degree of agitation within the range from about 400 to about 4,000 linear feet per minute.

7. A process according to claim 1 in which particle size is controlled by control of the amount of surfactant in the dispersion within the range from about 0.1 to about 2 parts per part of polymer/coloring agent.

8. A process according to claim 1 in which particle size is controlled by maintaining the dispersion temperature at at least from about 25° to about 60° F. above the melting point of the polymer blend.

9. A process according to claim 8 in which particle size is controlled so as to spherize the particles.

10. A process according to claim 1 in which the polymer is a thermoplastic synthetic resin.

11. A process according to claim 10 in which the polymer is polyethylene.

12. A process according to claim 10 in which the polymer is an ethylene-vinyl acetate copolymer.

13. A process according to claim 1 in which the charge-directing agent is a nigrosine dye.

14. A process according to claim 1 in which the charge-directing agent is a Nile Blue.

15. A process according to claim 1 in which the charge-directing agent is a Algosol Blue.

16. A process according to claim 1 in which the charge-directing agent is a Diamine Black.

17. A process according to claim 1 in which the coloring agent is carbon black.

18. A process according to claim 1 in which the coloring agent is present in an amount between 0.005 and 0.2 parts by weight, per part of polymer; the charge-directing agent is present in an amount between 0.0001 and 0.10 parts by weight, per part of polymer; and the surfactant is present in an amount between 0.2 and 1 parts by weight, per part of blend.

\* \* \* \* \*